(12) United States Patent
Toyoda et al.

(10) Patent No.: US 7,383,557 B2
(45) Date of Patent: Jun. 3, 2008

(54) RECORDING DISK APPARATUS HAVING REGIONS OF CONSTRAINED THERMAL CONDUCTION

(75) Inventors: Hiroyuki Toyoda, Chiyoda (JP);
Shigeo Ohashi, Tsuchiura (JP);
Yoshiaki Yamauchi, Minori (JP);
Kazuhiro Oda, Yokohama (JP);
Makoto Ibe, Hitachinaka (JP)

(73) Assignee: Hitachi - LG Data Storage, Inc., Tokyo (JP)

( * ) Notice: Subject to any disclaimer, the term of this patent is extended or adjusted under 35 U.S.C. 154(b) by 547 days.

(21) Appl. No.: 11/021,986

(22) Filed: Dec. 21, 2004

(65) Prior Publication Data
US 2005/0169120 A1 Aug. 4, 2005

(30) Foreign Application Priority Data
Dec. 24, 2003 (JP) .............................. 2003-426106

(51) Int. Cl.
*G11B 7/00* (2006.01)
*G11B 33/14* (2006.01)
(52) U.S. Cl. ..................................... 720/649; 360/97.02
(58) Field of Classification Search ...................... None
See application file for complete search history.

(56) References Cited

U.S. PATENT DOCUMENTS

| | | | | |
|---|---|---|---|---|
| 4,771,412 A | * | 9/1988 | Aihara et al. ................ | 720/649 |
| 5,099,466 A | * | 3/1992 | Kimura et al. ........... | 369/30.81 |
| 5,297,116 A | * | 3/1994 | Ikuma ......................... | 720/649 |
| 5,621,288 A | * | 4/1997 | Seki et al. ................... | 318/431 |
| 6,721,128 B1 | * | 4/2004 | Koizumi et al. ......... | 360/97.02 |
| 2001/0006503 A1 | * | 7/2001 | Braitberg et al. ........... | 369/77.2 |

FOREIGN PATENT DOCUMENTS

JP 2003-249067 9/2003

* cited by examiner

*Primary Examiner*—William Korzuch
*Assistant Examiner*—Peter Vincent Agustin
(74) *Attorney, Agent, or Firm*—Townsend and Townsend and Crew LLP

(57) ABSTRACT

In a recording disk apparatus, a pickup element and an electric element for at lease one of supplying an electric power to at least one of a recording disk driving motor and the pickup and processing a signal to be recorded into the recording disk and/or the signal read from the recording disk are prevented from overlapping each other as seen in a thickness direction of the recording disk to restrain a thermal conduction between the pickup element and the electric element so that a thermal conduction restraining area extending along an imaginary directional line crossing an imaginary straight line passing the pickup element and the electric element as seen in the thickness direction is formed between the pickup element and the electric element as seen in the thickness direction.

19 Claims, 7 Drawing Sheets

RECORDING DISK APPARATUS HAVING REGIONS OF CONSTRAINED THERMAL CONDUCTION

BACKGROUND OF THE INVENTION

The present invention relates to a recording disk apparatus, for example, an optical recording disk apparatus for recording an information or a signal into and/or reading the information or signal from an optical recording disk such as CD, DVD or the like.

JP-A-2003-249067 discloses an optical recording disk apparatus in which a case is divided by a partition member therein to a first chamber containing therein a tray for holding thereon an optical recording disk, a spindle motor for rotating the optical recording disk, and a pickup movable in a radial direction of the optical recording disk, and a second chamber containing therein an electric substrate on which electronic elements are mounted, so that a heat energy is restrained by the partition member from being transmitted from the electronic elements into the second chamber.

BRIEF SUMMARY OF THE INVENTION

An object of the present invention is to provide a recording disk apparatus, for example, an optical recording disk apparatus, in which apparatus an increase in temperature of a pick up is restrained.

In a recording disk apparatus for recording a signal into and/or reading the signal from a recording disk, comprising, a motor for driving rotationally the recording disk, a pickup element being made of a semiconductor to generate an optical power (optical beam) to form the signal to be recorded into the recording disk and/or to be read from the recording disk, and movable in a radial direction of the recording disk along a recording surface of the recording disk through which recording surface the signal is capable of being recorded into the recording disk and/or of being read from the recording disk, an electric element made of the semiconductor (the semiconductor forming the pickup element and the semiconductor forming the electric element may be equal to each other and different from each other) for at lease one of supplying an electric power to at least one of the motor and the pickup (to both of the motor and the pickup or to at least the motor) and processing the signal to be recorded into the recording disk and/or the signal read from the recording disk, a first (preferably metallic) cover covering the recording surface of the recording disk and the pickup in such a manner that the pickup is arranged between the recording surface and the first cover in a thickness direction of the recording disk, and a second (preferably metallic) cover covering a reverse surface of the recording disk opposite to the recording surface of the recording disk in the thickness direction of the recording disk, the pickup element and the electric element are prevented from overlapping each other as seen in the thickness direction of the recording disk to restrain a thermal conduction between the pickup element and the electric element so that a thermal conduction restraining area extending along an imaginary (straight, bent or curved) directional line crossing an imaginary straight line passing the pickup element and the electric element as seen in the thickness direction is formed between the pickup element and the electric element as seen in the thickness direction.

According to the invention, since the pickup element and the electric element are prevented from overlapping each other as seen in the thickness direction of the recording disk to restrain a thermal conduction between the pickup element and the electric element so that a thermal conduction restraining area extending along an imaginary (straight, bent or curved) directional line crossing an imaginary straight line passing the pickup element and the electric element as seen in the thickness direction is formed between the pickup element and the electric element as seen in the thickness direction, an increase in temperature of the pick up is restrained.

The first cover may have at least one of a set of holes (opposite or facing to the recording surface in the thickness direction with or without any member between the set of holes and the recording surface in the thickness direction) arranged along the imaginary directional line and an oblong hole elongated along the imaginary directional line (and opposite or facing to the recording surface in the thickness direction with or without any member between the oblong hole and the recording surface in the thickness direction) to facilitate a restraint of thermal conduction through the first cover at the thermal conduction restraining area between the pickup element and the electric element. (A distance between the (oblong) holes in a direction perpendicular to the imaginary straight line is smaller than a length of each of the (oblong) holes in the direction perpendicular to the imaginary straight line, and/or the length of each of the (oblong) holes in the direction perpendicular to the imaginary straight line is longer than another length of each of the holes in another direction parallel to the imaginary straight line, as seen in the thickness direction of the recording disk. The imaginary straight line may pass between the holes as seen in the thickness direction.)

The recording disk apparatus may further comprise a cover member closing (for example, hermetically) the at least one of the set of holes and the oblong hole, so that a contaminant is prevented from proceeding from an outside of the recording disk apparatus to an inside thereof. It is preferable for effectively restraining the thermal conduction through the cover member that a coefficient of thermal conductivity of the cover member is lower than that of the first cover, that a thickness of the cover member is smaller than a thickness of the first cover at the at least one of the set of holes and the oblong hole, and/or that the cover member is prevented from extending from a side of the first cover to another side of the first cover through the at least one of the set of holes and the oblong hole. The cover member (the tape) may be fixed or adhered to an outer (periphery) surface of the first cover (opposite to an inner surface of the first cover facing or opposite to the recording surface)(so that an adhesive or a welded part of at least one of the cover member and the first cover between the cover member and the first cover is prevented from being exposed to the outer environment through the at least one of the set of holes and the oblong hole). The outer surface of the first cover may have a dent portion receiving the cover member.

The first cover may have at least one groove extending along the imaginary directional line (and being opposite facing to the recording surface in the thickness direction with or without any member between the at least one groove and the recording surface in the thickness direction) to facilitate a restraint of thermal conduction through the first cover at the thermal conduction restraining area between the pickup element and the electric element.

The recording disk apparatus may further comprise a member extending continuously along the imaginary directional line, being separated away from the electric element (and the pickup element) as seen in the thickness direction and overlapping the electric element (the whole of the electric element or more preferably a combination of the whole of the electric element and heat radiating metallic (aluminum) fins (extending between the electric element and the recording surface) in the thickness direction to contact directly an environment gas or air) for the electric element) as seen in another direction perpendicular to the thickness direction and parallel to the imaginary straight line, so that a gaseous communication (in a radial direction of the disk) between the electric element and the pickup element is restrained by the member to facilitate a restraint of thermal conduction through gaseous matter in the radial direction of the disk at the thermal conduction restraining area between the pickup element and the electric element. It is preferable for radiating a heat energy from the member to an environment at the outside the recording disk apparatus that the member extends (more preferably, monolithically) from at least one of the first and second covers, and/or the member is metallic.

The first and second covers may contact each other in such a manner that the first and second covers are separable from each other (so that a contact resistance in thermal conduction is generated between the first and second covers to restrain the thermal conduction between the first and second covers). If the electric element is supported by the second cover in such a manner that the electric element is supported through the second cover by the first cover (and is prevented from being supported by the first cover directly not-through the second cover), the heat energy is restrained from being transmitted from the electronic element to the first cover and is effectively transmitted to the second cover, so that the pickup between the recording disk and the first cover in the thickness direction is restrained from being affected by the heat energy.

The first and second covers are connected to each other in an inseparable manner, so that the heat energy is effectively transmitted from the first cover to the second cover. This is preferable when the electric element is supported through the first cover by the second cover (and is prevented from being supported by the second cover directly not-through the first cover).

It is preferable for effectively discharging the heat energy from the electronic element to the outside of the recording disk apparatus that the electric element is supported by at least one (one or both) of the first and second covers in such a manner that a major part (at least more than half) of the thermal conduction through solid sate between the pickup element and the electric element is prevented from being carried out not-though the at least one (one or both) of the first and second covers contacting the environment gas at the outside of the recording disk apparatus (when each or at least one of the first and second covers is separable away from the motor and/or the first and second covers contacting each other are separable away from each other).

The recording disk apparatus may further comprise a support member supporting thereon the electric element, and a thermal isolation member arranged between the support member and at least one of the first and second covers so that the electric element is supported through the thermal isolation member and the support member by the at least one of the first and second cover (and is prevented from being supported by the at least one of the first and second cover directly not-through the support member, and the support member is prevented from being supported by the at least one of the first and second covers not-through the thermal isolation member), and a coefficient of thermal conductivity of the thermal isolation member is smaller than a coefficient of thermal conductivity of each of the support member and the at least one of the first and second covers. In this case, the heat energy is restrained from being transmitted to the at least one of the first and second covers, so that a part of the heat energy discharged from the electronic element to the environment gas at the outside of the recording disk apparatus not-through the at least one of the first and second covers is increased. It is preferable for increasing the part of the heat energy discharged from the electronic element to the environment gas at the outside of the recording disk apparatus not-through the at least one of the first and second covers that the support member is metallic, and a combination of the support member and the thermal isolation member surrounds the electric element, and/or that the support member is metallic, the electric element is supported on a support surface of the metallic support member, and a reverse surface of the metallic support member opposite to the support surface (in the thickness direction of the recording disk) is exposed to an outside of the recording disk apparatus (to be cooled from the outside of the recording disk apparatus).

The recording disk may further comprise a wiring substrate on which the electric element and another electric element are mounted, and which includes an electrically conductive wire connecting electrically the electric element and the another electric element to each other, wherein the wiring substrate has at least one of a set of holes (opposite or facing to the recording surface in the thickness direction with or without any member between the set of holes and the recording surface in the thickness direction) arranged along the imaginary directional line and an oblong hole elongated along the imaginary directional line (and opposite or facing to the recording surface in the thickness direction with or without any member between the oblong hole and the recording surface in the thickness direction) between the electric element and the another electric element to facilitate a restraint of thermal conduction through the wiring substrate in the radial direction of the recording disk at the thermal conduction restraining area between the pickup element and the electric element.

The pickup element may include a laser diode made of the semiconductor for generating a laser beam as the optical output power. The electric element may include at least one of a transistor made of the semiconductor to supply therethrough the (a major part of all) electric power to be consumed by the at least one of the motor and the pickup (to both of the motor and the pickup or to at least the motor), an integrated circuit for treating the signal to be recorded into the recording disk and/or read from the recording disk, and an integrated circuit for analog-digital conversion (of the signal to be recorded into the recording disk and/or read from the recording disk).

Other objects, features and advantages of the invention will become apparent from the following description of the embodiments of the invention taken in conjunction with the accompanying drawings.

DETAILED DESCRIPTION OF THE INVENTION

Figure 1:
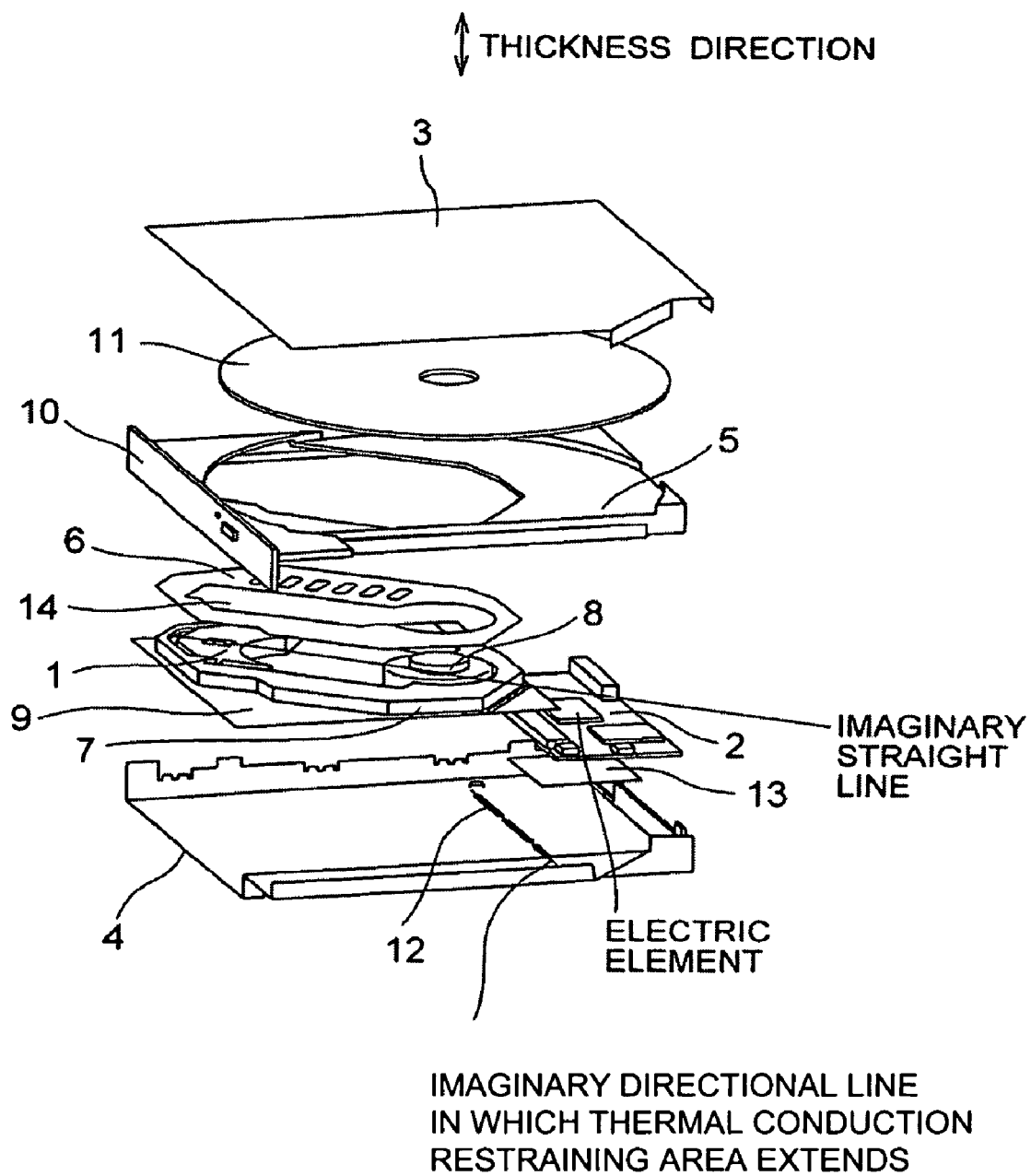
FIG. 1 is an oblique projection exploded view showing an optical recording disk apparatus as a first embodiment of the invention.

An embodiment of the invention is explained with making reference to FIG. 1.

FIG. 1 is an exploded view in which an optical disk apparatus including the embodiment of the invention is disassembled vertically to parts thereof for explanation.

In FIG. 1, an electronic substrate, a spindle motor and so forth as described below are contained between a top cover 3 and a bottom cover 4, and a tray 5 have a disk-shaped dent as a disk mounting area. A front panel 10 is attached to the tray 5. A mechanical unit including a pickup 1 for emitting a laser beam to a recording surface of a disk 11 to record and reproducing an information, a unit cover 6, a mechanical chassis 7, the spindle motor 8 for rotating the disk 11 and an under-cover 9 is fitted in the tray 5.

The electronic substrate 2 is arranged at an inside of the bottom cover, and the electronic substrate 2 and the mechanical unit are connected to each other by a flexible substrate for electrical communication therebetween. A central hold of the disk 11 is adapted to be fitted on the spindle motor 8. The pickup 1 is mounted on the mechanical chassis to be movable in a radial direction of the disk. The unit cover for dustproof and compressing the flexible substrate is mounted on the mechanical chassis. The pickup 1 records and reproduces the information by emitting the laser beam to the recording surface of the disk 11. The pickup 1 includes a laser device having a laser diode (hereafter called as LD) for generating the laser beam, a laser diode driver (hereafter called as LLD) for driving the LD and so forth, a head amplifier for amplifying an obtained electric current signal and converting it to a voltage signal, and so forth.

Incidentally, in the specification of the present application, the laser device may includes further additional element(s), such as an optical element, an electric circuit and so forth used to generate the laser beam and converting a reflected light beam from the disk.

The laser device 1 and the head amplifier mounted on the pickup 1 generates a heat energy during a recording or reproducing operation. Therefore, there is a risk of overheat (that is, a state of exceeding a predetermined temperature) of the pickup 1. Particularly, an increase of the temperature of the LD exceeding the predetermined temperature is not preferable, because it causes an decrease of life time period of the LD or a damage of the LD. Therefore, in the embodiment, the temperature of the LD is kept not more than an allowable temperature. A thermistor is arranged in the vicinity of the LD of the pickup 1.

The thermistor is a semiconductor element having a small thermal capacitance, and changing its resistance value significantly in accordance with a temperature change. By utilizing this characteristic, the thermistor is used as a temperature sensor for detecting the temperature of the LD. The unit cover 6 has a slit 14 extending from a radially inner side of the disk to a radially outer side of the disk so that the laser beam of the pickup 1 can pass between the disk surface and the pickup.

Further, the optical disk apparatus has a moving device for moving the pickup 1 in a radial direction of the disk. The moving device has a stepping motor with a lead screw so that the lead screw and a screw portion of the pickup engage each other. Further, a guide bar extending in the radial direction of the disk is fitted in pickup 1 so that the pickup 1 is moved in the radial direction of the disk 13 by rotating the lead screw. Further, an encoder is attached to the stepping motor to detect a rotating amount of the stepping motor and a moved amount of the pickup 1 from an output of the encoder.

Incidentally, the moving device may have various structures for moving the pickup 1 between a rotational center and an outer peripheral portion on the disk 11. The electronic substrate 2, another electronic substrate arranged in the vicinity of the spindle motor to control the rotation of the disk and the pickup 1 are connected electrically through the flexible substrate. The front panel 10 has a button for starting an ejecting operation of the disk, and a disk side of the front panel 10 may have a sponge-like packing for improving a hermetical sealing of the optical disk apparatus.

Main heat energy generating elements such as an analog front end, a digital signal processor, and/or a regulator IC on the electronic substrate 2 are connected to the bottom cover 4 through a heat conductive sheet 13 of heat conductive silicone elastomer to transfer a heat energy through the heat conductive sheet 13 to the bottom cover 4. In this specification, the whole of the heat energy generated by the electronic elements mounted on the electronic substrate 2 is occasinally called as a heat energy of the electronic substrate.

In this embodiment, the bottom cover has a slit(s) structure 12. The slit(s) structure 12 is formed on a line which divides the bottom case 2 to a side of the pickup 1 and a side of the electronic substrate 2. Hereafter in the specification, the line dividing the bottom case 4 to the side of the pickup 1 and the side of the electronic substrate 2 is called as a bottom case dividing line. The bottom case dividing line extends in such a manner that an area of the side of the pickup 1 is greater than an area of the electronic substrate 2.

The slit(s) structure may be a structure in which an opening(s) area is formed along the bottom case dividing line or a structure in which a groove having a thinner thickness in comparison with an ambient area is formed along the bottom case dividing line. The greater a rate of the opening(s) area with respect to a length of an entire length of the bottom case in a direction of the bottom case dividing line, the higher a temperature decreasing effect for the pickup is, but the lower a strength of the bottom case is. This occurs also on the slit structure formed by the groove. For restraining the decrease of the strength, the slit(s) structure may be divided to slit structures as shown in FIG. 1.

In the bottom cover 4, the slit(s) structure 12 acts as a boundary isolating the heat energy of the electronic substrate 2 to be transmitted to the side of the pickup. Therefore, a width of the opening(s) area or a width of the thin thickness groove may be extremely smaller than a length thereof in its longitudinal direction (the direction of the bottom case dividing line). The electronic substrate 2 is made by the slit(s) structure of the bottom cover to discharge the heat energy only at the side of the electronic substrate 2 on the bottom cover. By limiting the discharging area of the heat energy of the electronic substrate to a small value with the slit(s), the temperature of the electronic substrate 2 increases, but the increase in temperature of the pickup is restrained. In this case, since a proof temperature of the electronic elements mounted on the electronic substrate 2 is higher than a proof temperature of the pickup, an error in operation of the optical disk apparatus is prevented.

Generally, forming the hole(s) in the optical disk apparatus causes a deterioration of dust proof with an air flowing into and out of a drive, and an increase of noise with a leakage of sound from an inside of the drive. But, in the slit(s) structure, since the hole(s) is closed by a tape or the like to prevent the air flow between the environment air and the inside of the optical disk apparatus, the dust does not proceed into the optical disk apparatus, and the noise does not increase. Further, closing the hole(s) with another material of lower thermal conductivity in comparison with the bottom cover 4 instead of the tape, the same effect as the slit(s) structure is obtainable while maintaining the strength of the bottom cover 4. Alternatively, when the hole(s) of the slit(s) structure is not closed, a cooling effect by the the air flowing in and out, is obtainable.

Further, there is an experimental result in which a deformed value of the drive with the slit(s) structure 12 after a dropping test is smaller than that without the slit(s) structure 12.

Embodiment 2

Figure 2:
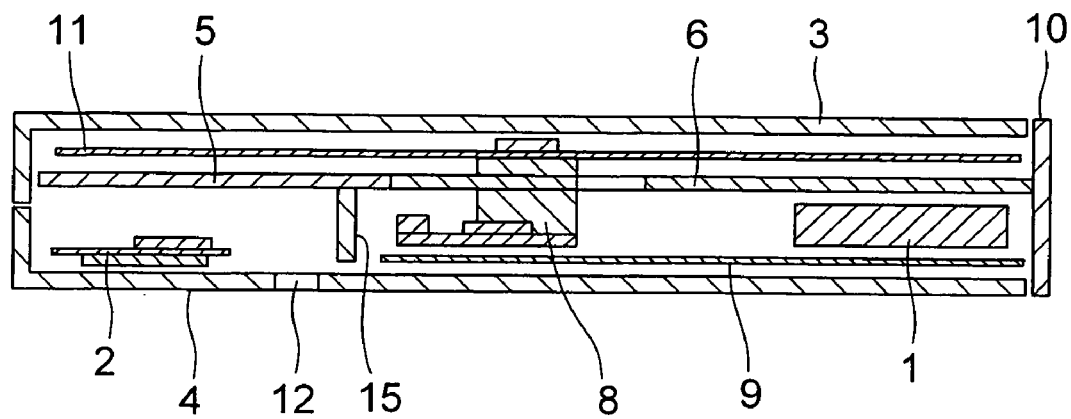
FIG. 2 is a cross sectional view showing an optical recording disk apparatus as a second embodiment of the invention.

FIG. 2 shows a vertical cross sectional view of an embodiment of the invention.

In FIG. 2, the above described slit(s) structure 12 and a windshield plate 15 partitioning a space surrounded by the bottom cover 4 and the tray 5 around the electronic substrate 2 are arranged in the optical disk apparatus, a flow is generated by a rotation of the disk 11, and the flow stirs the air heated by the heat energy generating elements in the drive to transfer the heat energy. The heat energy of the electronic substrate 2 causes the temperature increase of the pickup 1. Therefore, the windshield plate 15 is arranged to restrain the flow generated by the rotation of the disk 11, particularly, the air flow between the tray 5 and the electronic substrate 2, so that the temperature increase of the pickup is restrained. Since the air flow between the tray 5 and the electronic substrate 2 effective for cooling the electronic substrate 2 is weakened by the windshield 15, the temperature of the electronic substrate 2 is increased. On the other hand, the temperature increase of the pickup is restrained and the proof temperature of the electronic elements mounted on the electronic substrate 2 is higher than the proof temperature of the pickup, so that the error in operation of the optical disk apparatus is prevented.

The windshield plate 15 has at least one plate arranged on a line partitioning the space between the bottom cover 4 and the tray 5. The windshield plate 15 is arranged between the electronic substrate 2 and the center of the optical disk apparatus to restrain the flow. The windshield plate 15 may be formed as an extension of the tray 5 or the under cover 9, or as another member attached to tray 5 or the under cover 9. The another member may be a thin member such as a tape for intercepting the air flow. Incidentally, it does not disturb the movement of the mechanism unit including the tray 5, the pickup 1, the spindle motor 8 and so forth.

Further, a secondary member having a less thermal conductivity in comparison with a material of the bottom cover may close the hole(s) of the slit(s) structure 12 together with the windshield plate 15, so that both the effect of the slit(s) structure 12 and the effect of the windshield plate 15 are obtainable while keeping the strength of the bottom cover.

Embodiment 3

Figure 3:
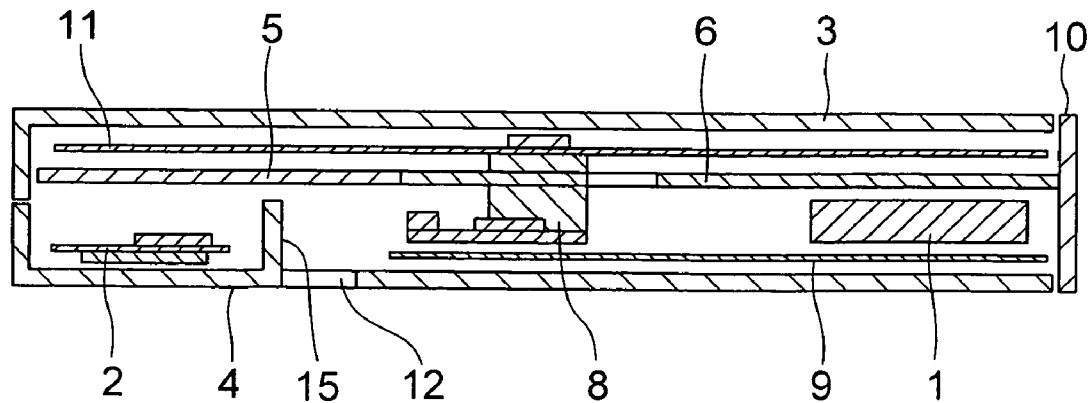
FIG. 3 is a cross sectional view showing an optical recording disk apparatus as a third embodiment of the invention.

FIG. 3 is a vertical cross sectional view of an embodiment in which the windshield plate 15 is formed by bending inwardly a cut portion to form the slit(s) structure 12 on the bottom cover 4.

In FIG. 3, the same effect as the embodiment shown in FIG. 2 is obtainable without increasing a number of elements.

Embodiment 4

Figure 4:
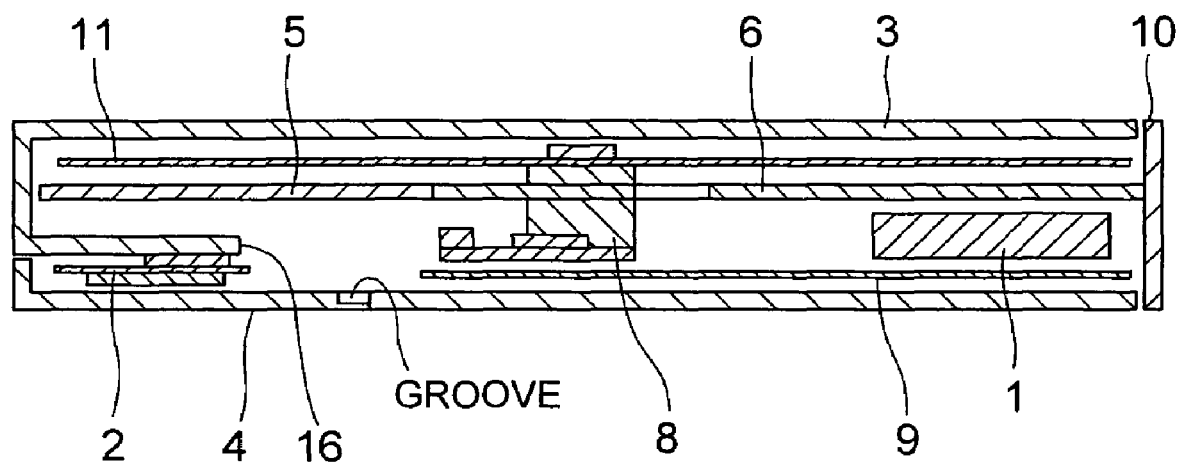
FIG. 4 is a cross sectional view showing an optical recording disk apparatus as a fourth embodiment of the invention.
Figure 5:
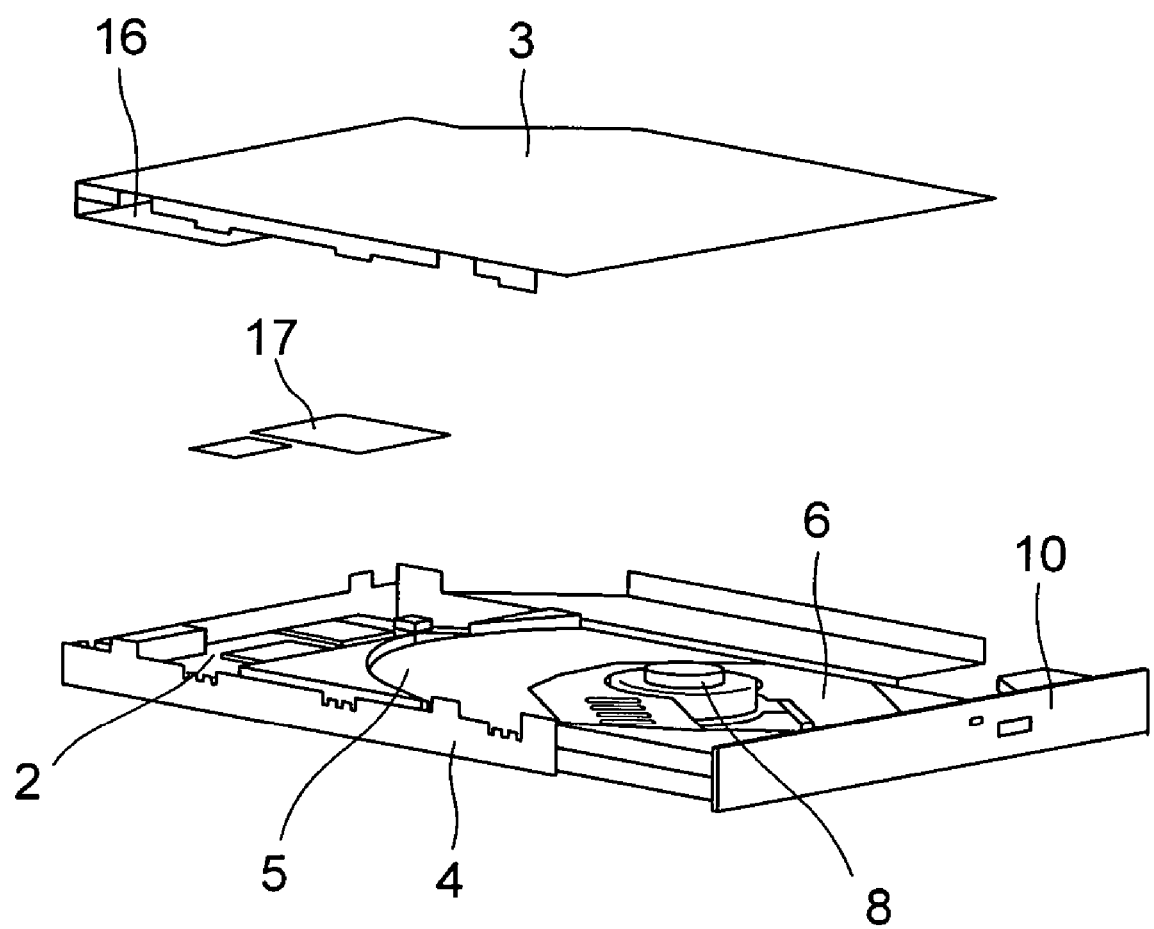
FIG. 5 is an oblique projection exploded view showing the optical recording disk apparatus as the fourth embodiment of the invention.

FIGS. 4 and 5 shows another embodiment.

Figure 6:
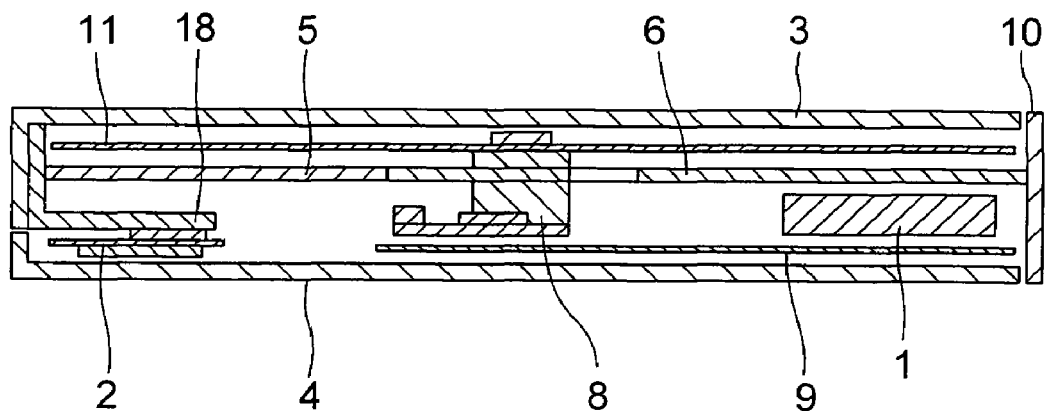
FIG. 6 is a cross sectional view showing an optical recording disk apparatus as a fifth embodiment of the invention.

FIG. 4 is a vertical cross sectional view of the embodiment, and FIG. 6 is an exploded view thereof.

In FIGS. 4 and 5, an extension of the top cover 3 is bent to form a substrate heat energy generating element(s) contacting structure 16. The electronic elements of the electronic substrate 2 contact the substrate heat energy generating element(s) contacting structure 16 of the top case 3 through a thermally conductive sheet 17. The heat energy of the electronic substrate 2 is transmitted to the top cover 3 of less affect for the pickup 1 through the substrate heat energy generating element(s) contacting structure 16. Therefore, an amount of the heat energy transmitted to the pickup through the bottom cover 4 of significant effect for the pickup 1 and the air flow between the electronic substrate and the tray can be decreased to decrease the temperature of the pickup.

Further, the electronic substrate 2 is fixed to the top cover 3 by a screw(s) while prevented from contacting the bottom cover 4, so that a major part of the heat energy of the electronic substrate 2 is transmitted to the top cover to decrease the temperature of the pickup.

Embodiment 5

FIG. 6 is a vertically cross sectional view showing an embodiment in which an L-shaped member 17 disjoined from the top cover 3 is used instead of the substrate heat energy generating element(s) contacting structure 16 of the embodiment shown in FIG. 4.

In FIG. 6, the L-shaped member 17 contacts the electronic elements on the electronic substrate 2 through the thermally conductive sheet. And, the L-shaped member 17 and the top cover 3 contact thermally each other.

This embodiment in which the top cover 3 and the L-shaped member 17 contacting the electronic substrate 2 transfer the heat energy from the electronic substrate 2 to the top cover 3 has the same effect as the embodiment shown in FIG. 4. Further, since the L-shaped member 17 is disjoined from the top cover 3, an assembling can be performed effectively.

Embodiment 6

Figure 7:
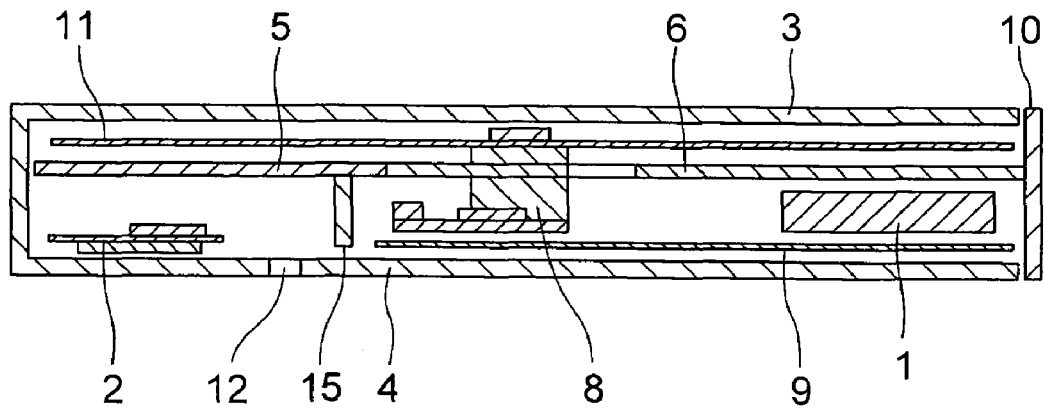
FIG. 7 is a cross sectional view showing an optical recording disk apparatus as a sixth embodiment of the invention.

FIG. 7 is a vertically cross sectional view of an embodiment having a structure for transferring the heat energy of the electronic substrate 2 to the top cover by extending the top cover 3 to an lower surface of the electronic substrate 2.

In FIG. 7, the top cover 3 contacts the heat energy generating elements of the electronic substrate 2 through the thermally conductive sheet. In this embodiment, a narrow clearance as the slit(s) structure 12 is formed between the top cover 3 and the bottom cover 4, that is, on a part of a cover covering the recording surface of the recording disk. Therefore, under effects of the slit(s) structure 12 and the windshield plate 15, the heat energy of the electronic substrate 2 is more effectively transmitted to the top cover to restrain the temperature increase of the electronic substrate 2 in comparison with the embodiment shown in FIG. 2, while the same temperature increase restraining effect of the pickup 1 as the embodiment shown in FIG. 2 is obtainable.

Embodiment 7

Figure 8:
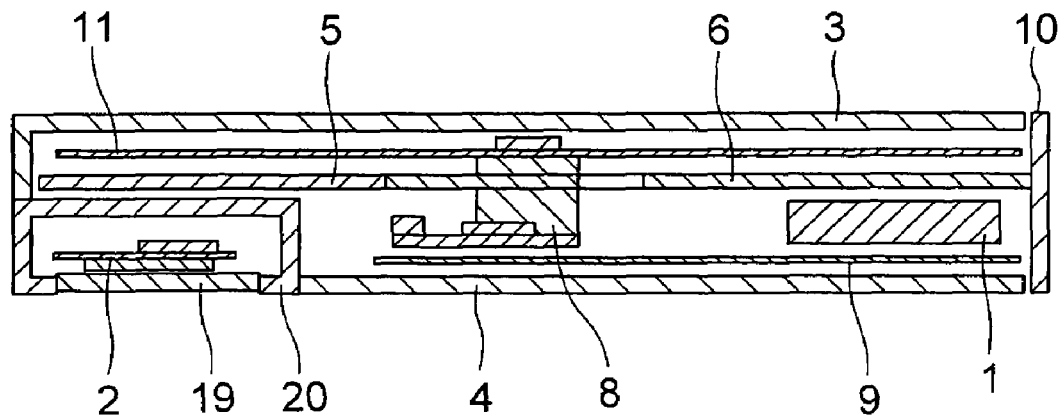
FIG. 8 is a cross sectional view showing an optical recording disk apparatus as a seventh embodiment of the invention.

FIG. 8 is a vertically cross sectional view of an embodiment in which the electronic substrate 2 surrounded by a dusttight case 20 of low thermal conductivity and a heat radiating plate 19 of high thermal conductivity is incorporated in the optical disk apparatus.

In FIG. 8, a part formed by the electronic substrate 2, the dusttight case 20 and the heat radiating plate 19 is fixed to the top cover 3 and the bottom cover 4. Incidentally, the heat radiating plate 19 is prevented from contacting directly with the bottom cover 4 (not through the dusttight case 20 and the top cover 3).

The part formed by the electronic substrate 2, the dusttight case 20 and the heat radiating plate 19 is thermally separated from the other part of the optical disk apparatus, so that the heat energy of the electronic substrate 2 does not affect the pickup 1. Further, the heat radiating plate 19 radiates the heat energy from the electronic substrate 2.

Therefore, in the part formed by the electronic substrate 2, the dusttight case 20 and the heat radiating plate 19, the heat energy generated by the electronic substrate 2 can be increased to a degree at which the heat radiating plate 19 can protect the thermally weakest electronic element on the electronic substrate 2 without taking a care on an effect to the pickup, so that a degree of freedom for design is increased.

Further, by forming a slight clearance between the part formed by the electronic substrate 2, the dusttight case 20 and the heat radiating plate 19 and the bottom cover 4, similarly to the slit(s) structure, the thermal conduction from the electronic substrate to the bottom case 4 can be decerased.

Embodiment 8

Figure 9:
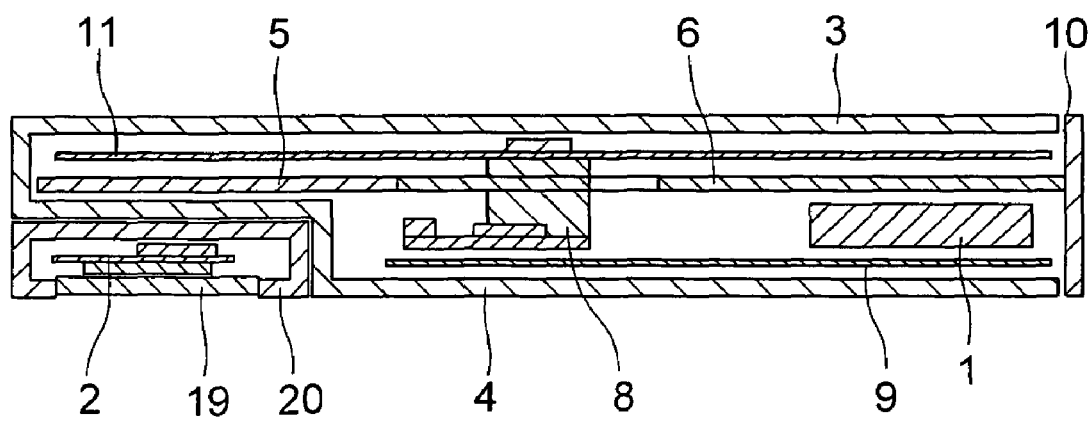
FIG. 9 is a cross sectional view showing an optical recording disk apparatus as an eighth embodiment of the invention.

FIG. 9 is a vertically cross sectional view of an embodiment in which the electronic substrate 2 is surrounded by the dusttight case 20 of low thermal conductivity and the heat radiating plate 19 of high thermal conductivity to be arranged at the outside of the optical disk apparatus.

In FIG. 9, by arranging completely the part formed by the electronic substrate 2, the dusttight case 20 and the heat radiating plate 19 at the outside of the optical disk apparatus or the outside of the top cover 3 and the bottom cover 4, the thermal effect from the electronic substrate 2 is isolated to obtain the same effect as the embodiment shown in FIG. 8.

Further, by arranging the electronic elements at the outside of the optical disk apparatus or the outside of the top cover 3 and the bottom cover 4 to be separated from the optical disk apparatus, the top cover 3 and the bottom cover 4, the electronic substrate can be easily removed. Therefore, a repair and a performance renewal of the optical disk apparatus can be easily performed by replacement of the electronic substrate.

Embodiment 9

Figure 10:
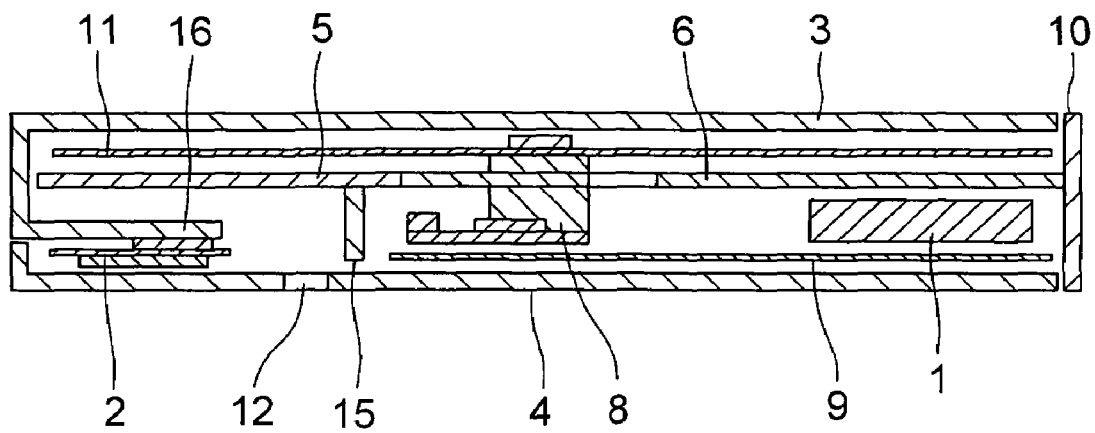
FIG. 10 is a cross sectional view showing an optical recording disk apparatus as a ninth embodiment of the invention.

FIG. 10 is a vertically cross sectional view of an embodiment.

In FIG. 10, the substrate heat energy generating element (s) contacting structure 16 has the slit(s) structure, the windshield plate 15 and the thermally conductive sheet thorough which the electronic substrate 2 and the top cover 3 contact each other. These three improves an effect for restraining the heat energy of the electronic substrate 2 from affecting the pickup. Incidentally, the substrate heat energy generating element(s) contacting structure 16 may be replaced by the L-shaped member 18 in the embodiment of FIG. 6 to obtain the effect.

Embodiment 10

Figure 11:
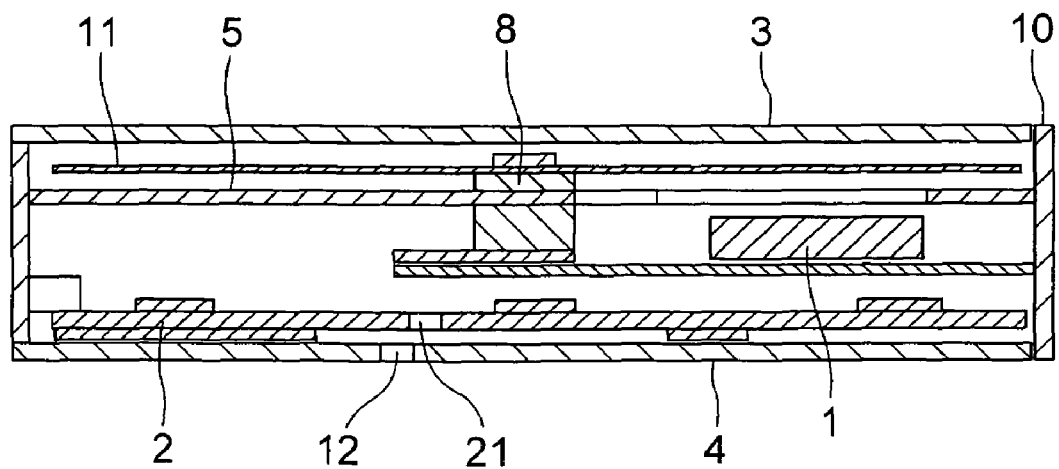
FIG. 11 is a cross sectional view showing an optical recording disk apparatus as a tenth embodiment of the invention.

FIG. 11 is a vertically cross sectional view of an embodiment in which the electronic substrate 2 has the same planar area amount as the optical disk apparatus.

In FIG. 11, a temperature increase just under the pickup 1 causes a temperature increase of the pickup in the optical disk apparatus. Therefore, in this embodiment, the main heat energy generating elements on the electronic substrate 2 are arranged as far as possible from the pickup. Further, a set of holes aligned along a line is arranged on the electronic substrate 2 between a position just under the main heat energy generating elements and a position just under the pickup. This is called as an electronic substrate slit(s) structure 21. The heat energy of the main heat energy generating elements is restrained by the electronic substrate slit(s) structure 21 from being transmitted to the position just under the pickup thorough the electronic substrate 2, so that the temperature increase of the pickup is restrained. Further, by forming the slit(s) structure 12 on the bottom cover 12, the effect is further improved.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A recording disk apparatus for recording a signal into and/or reading the signal from a recording disk, comprising:
    a motor for driving rotationally the recording disk,
    a pickup being made of a semiconductor to generate an optical power to form the signal to be recorded into the recording disk and/or to be read from the recording disk, and movable in a radial direction of the recording disk along a recording surface of the recording disk through which recording surface the signal is capable of being recorded into the recording disk and/or of being read from the recording disk, an electric element made of the semiconductor for at least one of (a) supplying an electric power to at least one of the motor or the pickup or (b) processing the signal to be recorded into the recording disk and/or the signal read from the recording disk, a first cover covering the recording surface of the recording disk and the pickup in such a manner that the pickup is arranged between the recording surface and the first cover in a thickness direction of the recording disk, and a second cover covering a reverse surface of the recording disk opposite to the recording surface of the recording disk in the thickness direction of the recording disk, wherein the pickup and the electric element are prevented from overlapping each other as seen in the thickness direction of the recording disk to restrain a thermal conduction between the pickup and the electric element so that a thermal conduction restraining area extending along an imaginary directional line crossing an imaginary straight line passing the pickup and the electric element as seen in the thickness direction is formed between the pickup and the electric element as seen in the thickness direction, the first cover having at least one oblong hole elongated along the imaginary directional line to facilitate a restraint of thermal conduction through the first cover at the thermal conduction restraining area between the pickup and the electric element.

2. A recording disk apparatus according to claim 1, further comprising a cover member closing the at least one of the set of holes and the oblong hole.

3. A recording disk apparatus according to claim 2, wherein a thickness of the cover member is smaller than a thickness of the first cover at the at least one of the set of holes and the oblong hole.

4. A recording disk apparatus according to claim 2, wherein the cover member is prevented from extending from a side of the first cover to another side of the first cover through the at least one of the set of holes and the oblong hole.

5. A recording disk apparatus according to claim 2, wherein the cover member is fixed to an outer surface of the first cover.

6. A recording disk apparatus according to claim 1, wherein the first cover has at least one groove extending along the imaginary directional line to facilitate a restraint of thermal conduction through the first cover at the thermal conduction restraining area between the pickup element and the electric element.

7. A recording disk apparatus according to claim 1, wherein the first and second covers contact each other in such a manner that the first and second covers are separable from each other.

8. A recording disk apparatus according to claim 7, wherein the electric element is supported by the second cover in such a manner that the electric element is supported through the second cover by the first cover.

9. A recording disk apparatus according to claim 1, wherein the first and second covers are connected to each other in an inseparable manner.

10. A recording disk apparatus according to claim 1, wherein the electric element is supported by at least one of the first and second covers in such a manner that a major part of the thermal conduction through solid state between the pickup and the electric element is carried through the at least one of the first and second covers.

11. A recording disk apparatus according to claim 1, wherein the pickup includes a laser diode made of the semiconductor for generating a laser beam as the optical output power.

12. A recording disk apparatus according to claim 1, wherein the electric element includes at least one of a transistor made of the semiconductor to supply therethrough the electric power to be consumed by the at least one of the motor and the pickup, an integrated circuit for treating the signal to be recorded into the recording disk and/or read from the recording disk, and an integrated circuit for analog-digital conversion.

13. A recording disk apparatus for recording a signal into and/or reading the signal from a recording disk, comprising:
a motor for driving rotationally the recording disk,
a pickup being made of a semiconductor to generate an optical power to form the signal to be recorded into the recording disk and/or to be read from the recording disk, and movable in a radial direction of the recording disk along a recording surface of the recording disk through which recording surface the signal is capable of being recorded into the recording disk and/or of being read from the recording disk,
an electric element made of the semiconductor for at least one of (a) supplying an electric power to at least one of the motor or the pickup or (b) processing the signal to be recorded into the recording disk and/or the signal read from the recording disk, wherein the pickup and the electric element are prevented from overlapping each other as seen in the thickness direction of the recording disk to restrain a thermal conduction between the pickup and the electric element so that a thermal conduction restraining area extending along an imaginary directional line crossing an imaginary straight line passing the pickup and the electric element as seen in the thickness direction is formed between the pickup and the electric element as seen in the thickness direction,
a first cover covering the recording surface of the recording disk and the pickup in such a manner that the pickup is arranged between the recording surface and the first cover in a thickness direction of the recording disk,
a second cover covering a reverse surface of the recording disk opposite to the recording surface of the recording disk in the thickness direction of the recording disk, and
a member extending continuously along the imaginary directional line, being separated away from the electric element as seen in the thickness direction and overlapping the electric element as seen in another direction perpendicular to the thickness direction and parallel to the imaginary straight line, so that a gaseous communication between the electric element and the pickup is restrained by the member to facilitate a restraint of thermal conduction through gaseous matter at the thermal conduction restraining area between the pickup and the electric element.

14. A recording disk apparatus according to claim 13, wherein the member extends from at least one of the first and second covers.

15. A recording disk apparatus according to claim 13, wherein the member is metallic.

16. A recording disk apparatus for recording a signal into and/or reading the signal from a recording disk, comprising:
a motor for driving rotationally the recording disk,
a pickup being made of a semiconductor to generate an optical power to form the signal to be recorded into the recording disk and/or to be read from the recording disk, and movable in a radial direction of the recording disk along a recording surface of the recording disk through which recording surface the signal is capable of being recorded into the recording disk and/or of being read from the recording disk, an electric element made of the semiconductor for at least one of (a) supplying an electric power to at least one of the motor or the pickup or (b) processing the signal to be recorded into the recording disk and/or the signal read from the recording disk, a first cover covering the recording surface of the recording disk and the pickup in such a manner that the pickup is arranged between the recording surface and the first cover in a thickness direction of the recording disk, a second cover covering a reverse surface of the recording disk opposite to the recording surface of the recording disk in the thickness direction of the recording disk, and a support member supporting thereon the electric element, and a thermal isolation member arranged between the support member and at least one of the first and second covers so that the electric element is supported through the thermal isolation member and the support member by the at least one of the first and second cover, and a coefficient of thermal conductivity of the thermal isolation member is smaller than a coefficient of thermal conductivity of each of the support member and the at least one of the first and second cover, wherein the pickup and the electric element are prevented from overlapping each other as seen in the thickness direction of the recording disk to restrain a thermal conduction between the pickup and the electric element so that a thermal conduction restraining area extending along an imaginary directional line crossing an imaginary straight line passing the pickup and the electric element as seen in the thickness direction is formed between the pickup and the electric element as seen in the thickness direction.

17. A recording disk apparatus according to claim 16, wherein the support member is metallic, and a combination of the support member and the thermal isolation member surrounds the electric element.

18. A recording disk apparatus according to claim 16, wherein the support member is metallic, the electric element is supported on a support surface of the metallic support member, and a reverse surface of the metallic support member opposite to the support surface is exposed to an outside of the recording disk apparatus.

19. A recording disk apparatus for recording a signal into and/or reading the signal from a recording disk, comprising:

a motor for driving rotationally the recording disk, a pickup being made of a semiconductor to generate an optical power to form the signal to be recorded into the recording disk and/or to be read from the recording disk, and movable in a radial direction of the recording disk along a recording surface of the recording disk through which recording surface the signal is capable of being recorded into the recording disk and/or of being read from the recording disk, an electric element made of the semiconductor for at least one of (a) supplying an electric power to at least one of the motor or the pickup or (b) processing the signal to be recorded into the recording disk and/or the signal read from the recording disk, wherein the pickup and the electric element are prevented from overlapping each other as seen in the thickness direction of the recording disk to restrain a thermal conduction between the pickup and the electric element so that a thermal conduction restraining area extending along an imaginary directional line crossing an imaginary straight line passing the pickup and the electric element as seen in the thickness direction is formed between the pickup and the electric element as seen in the thickness direction, a first cover covering the recording surface of the recording disk and the pickup in such a manner that the pickup is arranged between the recording surface and the first cover in a thickness direction of the recording disk, a second cover covering a reverse surface of the recording disk opposite to the recording surface of the recording disk in the thickness direction of the recording disk, and a wiring substrate on which the electric element and another electric element are mounted, and which includes an electrically conductive wire connecting electrically the electric element and the another electric element to each other, wherein the wiring substrate has at least one of a set of holes arranged along the imaginary directional line and an oblong hole elongated along the imaginary directional line between the electric element and the another electric element to facilitate a restraint of thermal conduction through the wiring substrate at the thermal conduction restraining area between the pickup and the electric element.

* * * * *